United States Patent Office 2,755,312
Patented July 17, 1956

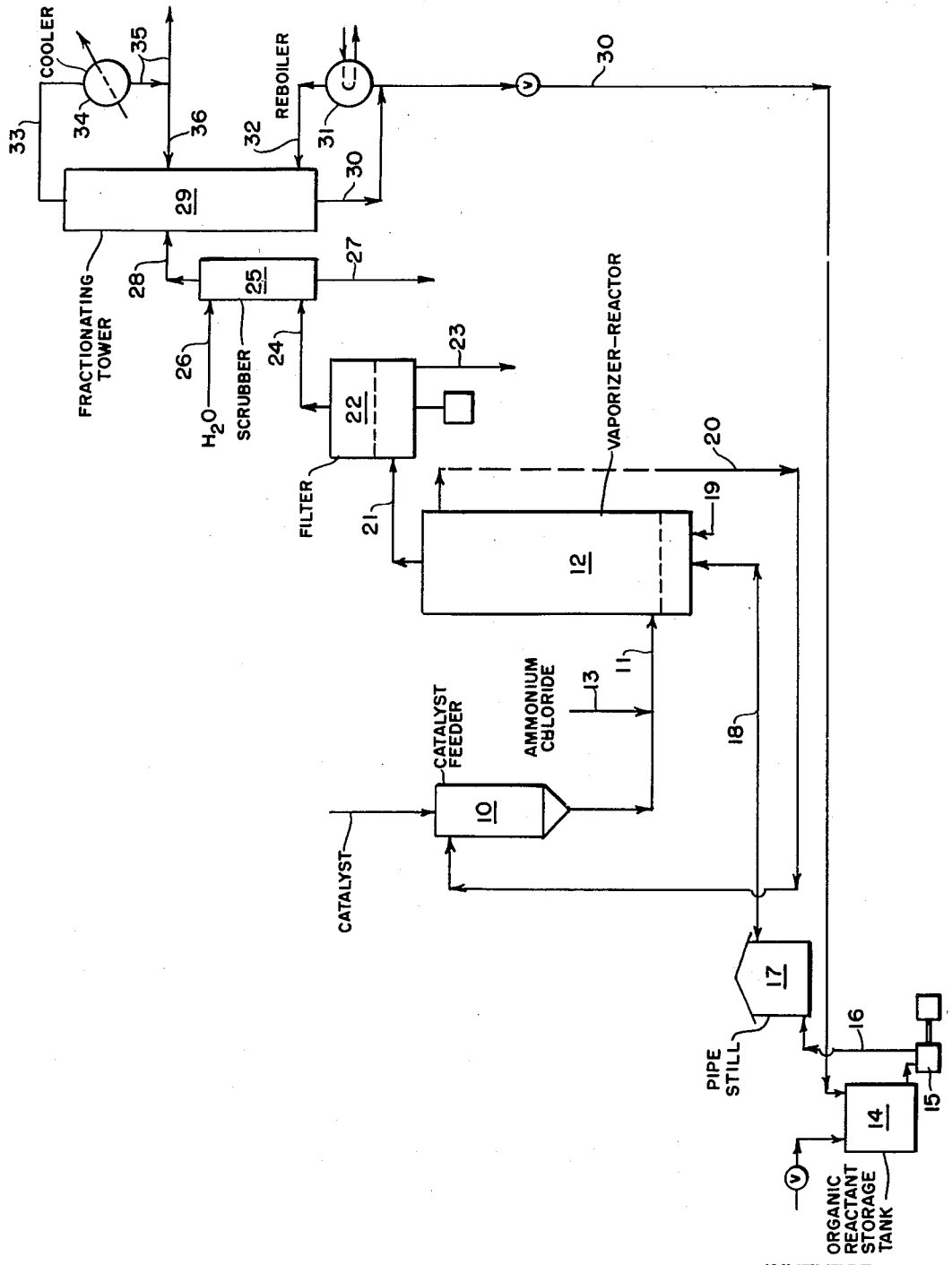

2,755,312

PRODUCTION OF ORGANIC CHLORIDES BY REACTION OF ORGANIC COMPOUND WITH AMMONIUM CHLORIDE

Robert M. Thomas, Niagara Falls, N. Y., assignor to Olin Mathieson Chemical Corporation, a corporation of Virginia Application December 29, 1951, Serial No. 264,126

7 Claims. (Cl. 260—652)

My invention relates to the manufacture of organic chlorides from ammonium chloride and acetylene or organic oxygen, sulfur and nitrogen bearing compounds. In particular, my invention relates to a method of handling and contacting ammonium chloride with reactive organic compounds, in the presence of a catalyst, at elevated temperatures and in the vapor state.

Pending applications, Serial No. 243,345, filed August 23, 1951, and Serial No. 243,346, filed August 23, 1951, of John W. Churchill and Robert M. Thomas disclose that organic compounds containing a reactive oxygen, sulfur or nitrogen group such as an alcohol, ether, aldehyde, ester or a sulfur or nitrogen analogue thereof react with ammonium halides (but not with ammonium iodide) at about 250° to 500° C. in the presence of a dehydrochlorination type catalyst of acidic to mildly alkaline character to form corresponding organic halides. The reaction with alcohols, particularly methanol and ethanol, to produce methyl and ethyl chlorides, respectively, is preferred. Alumina is the most effective catalyst but various activated earths and silicates, and metal halides are also effective. Temperatures of 250° C. to 500° C. are employed and contact time is inversely correlated with temperature. A short contact time is desired at high temperature and is controlled by control of the space velocity of the reactants. Following the reaction, the vapors pass through a recovery system usually comprising scrubbing, cooling, condensing and distillation to fractionate the reaction mixture and recover the organic halide and ammonia.

Pending application, Serial No. 243,344, filed August 23, 1951, of John W. Churchill discloses that acetylene reacts with ammonium chloride at about 250° to 500° C. in the presence of a hydrochlorination type catalyst at atmospheric pressure to form vinyl chloride. The reaction is preferably conducted at about 250° to 350° C. An excess of acetylene is used, proportions of acetylene to ammonium chloride ranging from 2:1 to 5:1. Mercury is an effective catalyst, as are chlorides of lead, bismuth, barium, magnesium, vanadium, aluminum, zinc, and iron.

The desired reaction of ammonium chloride with organic substances to produce organic chlorides occurs at high temperature, in the range of 250° to 500° C. At this reaction temperature it is necessary for effective conversion that the ammonium chloride and organic reactant be in the vapor state. The engineering design of a commercial plant for producing organic chlorides by these reactions, however, is rendered exceedingly difficult by reason of the problems of heating and handling the ammonium chloride and contacting it with the organic reactant in a state facilitating reaction. Solid ammonium chloride is difficult to heat on a large scale and the vapors are exceedingly corrosive and difficult to handle without localized solidification and plugging.

Vaporization of ammonium chloride, for example, presents many difficult problems. An extraordinarily large heat input is required to vaporize ammonium chloride. About 39.6 kilocalories is required to vaporize one gram mole of ammonium chloride at 350° C. This required heat input includes not only the heat of vaporization but also the heat of dissociation of the acid and base components of the ammonium chloride. Moreover, the problem of vaporization is aggravated by the requirement that the heat must be supplied at a high temperature level to maintain the desired reaction conditions, by the tendency of ammonium chloride to sinter upon heating, by its corrosiveness and by its poor heat transfer characteristics. Its tendency to sublime further contributes to the problem of vapor phase handling since sufficient heat must be supplied to the ammonium chloride to maintain it at all times above the sublimation point in order to prevent recondensation on the first cool surface contacted. The transition from solid state to vapor state interferes with any superheat operation. Moreover, when solid ammonium chloride is contacted with a hot heat transfer surface, the small portion of the ammonium chloride in contact with the hot surface sublimes and shrinks away from the surface so that the bulk of the solid ammonium chloride is caked in a shape that has minimum contact with the heat transfer surface and thus the problem of heating and handling the mass is further aggravated. The vaporized ammonium chloride forms a film which effectively insulates the bulk of solid ammonium chloride from the heat transfer surface preventing effective vaporization of the remaining solid.

Severe corrosion problems are encountered when ammonium chloride is vaporized in an external heater and then introduced into a reactor as the vaporized ammonium chloride is highly corrosive. Morevore, when solid ammonium chloride is heated by a stream of hot vapors, either of the organic reactant or inert gases, the ammonium chloride crystals stick together to form lumps and the entire bed sinters.

I have found that when solid ammonium chloride is mixed with the solid catalyst in particle form, the ammonium chloride can be effectively heated and vaporized in situ for reaction in the vapor phase with the reactive organic compound in a manner eliminating the heating, charging and contacting problems inherently associated with reacting solid ammonium chloride at a temperature above its sublimation point. I have also found that, to avoid lumping and sintering of the ammonium chloride and to obtain effective vapor phase contact with the organic compound, it is essential that vaporization of the ammonium chloride only occur when admixed with particle form catalyst in the reaction zone.

According to my invention, the solid catalyst, for example, alumina, in particle form is circulated in a closed cycle through a reaction zone. Solid ammonium chloride is mixed with the circulating catalyst outside the reaction zone at a temperature below the sublimation point of the ammonium chloride and the resulting mixture is introduced to the reaction zone. Vapors of the organic reactant, for example, alcohol, are contacted with the mixture of ammonium chloride and catalyst in the reaction zone. The reaction vapors are separated from the catalyst and a stream of catalyst is withdrawn continuously or intermittently from the reaction zone. The temperature is maintained at about 250° to 500° C. in the reaction zone, advantageously by superheating the organic reactant sufficiently in an external heating zone.

My invention effectively avoids the problem of caking and the insulating effect that occurs when ammonium chloride is heated in bulk and minimizes the problem of corrosiveness as the ammonium chloride particles are rapidly vaporized and immediately react with the superheated organic reactant vapor thereby maintaining a minimum amount of ammonium chloride in the corrosive vapor phase.

Moreover, since the ammonium chloride is vaporized and reacted in the same zone, the heat of reaction aids the vaporization of the ammonium chloride and a considerable reduction in heat input is realized. For example, the heat of reaction of ammonium chloride with methanol reduces the 39.6 kilocalories per gram mole of ammonium chloride required to vaporize and dissociate ammonium chloride at 350° C. by about 6 kilocalories. This reduction of 15 per cent in heat input results in a considerable heat saving in a process such as this where the heat requirement is so large. Moreover, substantially no losses in heat transfer between the heating medium and the ammonium chloride are incurred and control of the reaction is easier as the vaporization tends to absorb heat and this tends to stabilize the temperature of the mixture.

The temperature and rate of introduction of the organic reactant vapor are selected in order to obtain from the top of the reacting zone a mixture of completely or partially converted reagents free from the major proportion of the catalyst. The finest portion of the catalyst may remain suspended in the vapor and a filter or a cyclone separator is provided in the system to remove such fines.

The process is ordinarily operated at atmospheric pressure but may be operated at reduced or elevated pressure. However, it is particularly advantageous to operate under such conditions that the organic reactant and reaction products are vaporized at the reaction temperature. To some extent, the capacity of any particular equipment may be increased by the use of elevated pressures. The use of pressures sufficiently low to cause sublimation of ammonium chloride, particularly below the preferred reaction temperatures, is undesirable in my process.

Various methods of handling the catalyst may be used in conducting the process of my invention. In one method the catalyst is circulated as a moving bed. The catalyst is in the form of a compact column of particles, pellets or pills and moves by gravity from an elevated hopper through a reaction zone. Solid ammonium chloride is mixed with the circulating catalyst bed before it enters the reaction zone. Advantageously a pelletized ammonium chloride and catalyst mixture is circulated through the reaction zone by an arrangement of baffles and grids. Catalyst is withdrawn from the reaction zone and returned to the elevated hopper by bucket elevators or by the injection of a carrier gas or vapor. This method advantageously provides opportunity for countercurrent contact of the mixture of catalyst and ammonium chloride with hot organic reactant vapors.

In another method of practicing my invention, the catalyst is handled in the form of a fluidized solids system in which the catalyst, in particle form, is maintained in a dense phase fluid state in the reaction zone. Solid ammonium chloride is mixed with the circulating catalyst before it enters the reaction zone and the mixture is introduced into the reaction zone where the catalyst is fluidized by the stream of incoming hot organic reactant vapors.

In yet another method of handling the catalyst, the catalyst is maintained in the form of a suspension by the hot organic reactant vapors in a reaction zone. Solid ammonium chloride is mixed with the catalyst outside the the reaction zone and the mixture is introduced into the reaction zone where the catalyst is maintained in the form of a suspension by the hot organic reactant vapors with catalyst being separated and returned to the circulating system.

In still another method of practicing my invention, the catalyst is handled in a mechanically moving bed. Solid ammonium chloride is mixed with the catalyst outside the reaction zone and the mixture is transported mechanically into the reaction zone with catalyst being removed mechanically.

In the operation of all these methods, an inert gas, for example, steam or nitrogen, may be used instead of the organic reactant to vaporize the ammonium chloride followed by introduction of the organic reactant to react with the vaporized ammonium chloride.

The organic reactant is sufficiently superheated to maintain the reaction gases in the reaction range of 300° to 600° C. In the case of methanol and ammonium chloride, the use of 24 moles of methanol vapor at 450° C. is sufficient to maintain the mixture at the preferred reaction temperature of 350° C. and to vaporize one mole of ammonium chloride. With methanol at 550° C., only 12 moles are required and at 650° C., only 6 moles are required. Less thermally stable reactants than methanol which cannot be heated to such temperatures may be used in this process but proportionally larger volumes must be used. Ethanol, for example, can be used up to about 450° C. in a ratio of about 24:1 and conversion of the ammonium chloride is 99 per cent or better. Where smaller proportions of organic reactant vapor are used, part of the required heat may be supplied by superheated inert gases admixed with the reactant. For this purpose, steam or nitrogen, for example, may be used.

The reaction temperature may be maintained by heating the reaction vessel by suitable means such as jacketing the vessel or by providing heat transfer tubes within the reaction vessel.

The catalyst should be in particle form. The ammonium chloride need not be finely divided. Under the conditions defined above ammonium chloride is vaporized and, while the rate of vaporization is in part determined by the state of subdivision of the solid, large particles will eventually be vaporized as well as fine particles. The fine crystals separated from the liquor of the ammonia-soda process are particularly advantageous.

The process of my invention is continuous and continuous separation and purification of the products and return of by-product ether, amines and unreacted organic material to the system is preferred. It is advisable to modify the details of the recovery procedure in each instance according to the physical properties of the organic reactant charged and the properties and concentration of the product. For example, when ethanol is the organic reactant, fractional distillation is probably the most economic method for recovery of ethyl chloride whereas a multi-stage extraction procedure may be more economical in the recovery of methyl chloride. In the case of methyl chloride, the reaction mixture usually comprises a mixture of methyl chloride, ammonia, small amounts of lower amines and ether, water vapor and unreacted ammonium chloride. Water scrubbing will remove in solution the ammonia, ammonium chloride, the amines and small amount of ether. This mixture may be worked up by distillation. The unabsorbed vapors comprising methyl chloride contaminated with small amounts of ether and saturated with water vapor advantageously are contacted in a second scrubbing tower with strong sulfuric acid. The ether and water vapor are absorbed by the sulfuric acid and the dried methyl chloride is recovered by condensation. The ether may be separated from the sulfuric acid by heating for disposal as by-product or for recycle. The sulfuric acid is reconcentrated occasionally as necessary.

The process of my invention is particularly applicable to the reaction of ammonium chloride with lower aliphatic alcohols. Ethanol, for example, may be vaporized and introduced into the bottom of a moving bed of ammonium chloride and alumina. The ammonium chloride is vaporized and reacts with the ethanol vapors to form ethyl chloride, ammonia and water. My process has special advantages in the preparation of methyl chloride and ethyl chloride from ammonium chloride and methanol and ethanol respectively. Other aliphatic alcohols which may be used as organic reactants in the process are isopropanol, isoamyl alcohol, lauryl alcohol and other higher aliphatic alcohols. Cycloaliphatic alcohols, for example cyclohexanol, and aromatic substituted alcohols such as benzhydrol may also be used.

The operation of my invention will be further illustrated by reference to the accompanying drawing which is a schematic flow diagram illustrating a method of operation by circulating the catalyst as a moving bed in compact particle form.

In the drawing, particle form catalyst is charged to a catalyst feeder 10 and moves by gravity as a compact bed as by line 11 to vaporizer-reactor 12. Solid ammonium chloride is added to the catalyst stream as by line 13 and the mixture flows to the vaporizer-reactor 12. The organic reactant, for example, alcohol, is pumped from tank 14 by means of pump 15 through line 16 to pipe still 17. In the pipe still 17, the organic reactant flows through the convection section and then through the pipe to the radiant section where it is vaporized and superheated to the desired temperature. The superheated organic reactant vapors are passed from pipe still 17 through line 18 to the vaporizing-reacting vessel 12. The superheated organic reactant vapor passes to the bottom of the vaporizing-reacting vessel 12 and up through the moving bed containing the catalyst and ammonium chloride. The organic reactant vapor vaporizes and reacts with the ammonium chloride. Part of the heat required to vaporize the ammonium chloride may be supplied by a superheated inert gas introduced as by line 19. The catalyst and possibly some unreacted admixed ammonium chloride is removed continuously from the vaporizer-reactor 12 as by line 20 and returned as a moving bed to the catalyst feeder 10 for return by gravity flow to the vaporizer-reactor 12 after the addition of more ammonium chloride.

The reaction product carrying catalyst fines are passed through line 21 to a filter 22. The filter 22 may appropriately be arranged for upflow of the reaction gases through an inert fibrous medium, for example, glass wool, which is supported and continuously or intermittently worked by means of reciprocating arms. Under these conditions the filter 22 is substantially non-clogging and accumulated materials fall to the bottom of the filter case where they are removed as by line 23.

In an alternative method of operation of my invention, a second reactor may be provided to provide adequate reaction time or to elevate the temperature of the reactants to complete the reaction. Such secondary reactor may be substantially the same size and shape as the vaporizing-reacting vessel 12 or it may be smaller but still of the same general character. The secondary reactor is in series with the vaporizing-reacting vessel 12 and may contain either a fluidized bed of catalyst or a fixed bed of catalyst. In the latter case the filter 22 is appropriately arranged between the two vessels so that catalyst fines from vaporizing-reacting vessel 12 are removed to prevent plugging of the fixed catalyst bed. Also, alternatively, the heated catalyst in the second zone may be circulated to the first and vice versa to utilize effectively the heat of the reaction.

The filtered reaction products are taken overhead from filter 22 through line 24 and passed into the lower portion of scrubber 25. Water is introduced to the top of scrubber 25 through line 26 in order to remove ammonia, ammonium chloride carry-over and water soluble materials such as lower amines and some lower ethers in the case of lower alcohol charging materials.

The water solution is removed from the bottoms of scrubber 25 through line 27 and is separately processed by distillation to recover ammonia and to fractionate the remaining water soluble materials for recycle or as by-products. The unabsorbed vapor stream from scrubber 25 passes through line 28 to fractionating tower 29 in which separation is effected between the organic chloride and the excess unreacted organic reactant which, depending upon the boiling point, may be taken as bottoms through line 30 and returned for recycle to organic reactant storage tank 14. A part of the bottom liquid product is pumped through reboiler 31 to the bottom of the tower 29 through line 32. The organic chloride product is then taken overhead through line 33 and cooler 34. The product is removed via line 35 except for the portion returned to the tower via line 36 as reflux.

I claim:

1. In the process of producing organic chlorides by the reaction of ammonium chloride with an organic compound reactive therewith to form an organic chloride at an elevated temperature and in the presence of a solid particle form catalyst effective to promote the reaction, the method which comprises maintaining a body of moving catalyst in a reaction zone, circulating a stream of catalyst to and from the reaction zone, adding solid ammonium chloride to the catalyst circulating to the reaction zone at a temperature below the sublimination point of ammonium chloride, introducing the reactive organic compound to the reaction zone while maintaining the temperature within the reaction zone at about 250° to 500° C. and separating reaction vapors from the catalyst.

2. The method of claim 1 in which the reactive organic compound is a lower aliphatic alcohol.

3. The method of claim 1 in which the catalyst is circulated as a moving bed in compact particle form.

4. The method which comprises maintaining a body of moving solid particle form dehydrochlorination type catalyst in a reaction zone, circulating a stream of the catalyst to and from the reaction zone, adding solid ammonium chloride to the catalyst circulating to the reaction zone at a temperature below the sublimination point of ammonium chloride, introducing a lower aliphatic alcohol to the reaction zone while maintaining the temperature within the reaction zone at about 250° to 500° C., and separating reaction vapors from the catalyst.

5. A process according to claim 4 in which the catalyst is alumina.

6. A process according to claim 4 in which the alcohol is methanol.

7. A process according to claim 4 in which the alcohol is ethanol.

References Cited in the file of this patent

UNITED STATES PATENTS

| | | |
|---|---|---|
| 1,812,542 | Nieuwland | June 30, 1931 |
| 2,328,430 | Dornte | Aug. 31, 1943 |
| 2,498,546 | Gorin | Feb. 21, 1950 |

FOREIGN PATENTS

| | | |
|---|---|---|
| 452,934 | Great Britain | Sept. 2, 1936 |
| 686,849 | Germany | Jan. 17, 1940 |
| 704,759 | Germany | Apr. 7, 1941 |

OTHER REFERENCES

Mellor: "Comprehensive Treatise on Inorganic and Theoretical Chemistry," vol. II, pp. 566–9, 573–4 (1922).

Rodebush et al.: "Jour. Am. Chem. Soc.," vol. 51, pp. 748–59 (1929).

Pray et al.: "Jour. Am. Chem. Soc.," vol. 70, pp. 433–4 (1948).

Stephenson: "Jour. Chem. Phys.," vol. 12, pp. 318–9 (1944).

"Chem. Abstracts," vol. 28, p. 7539 (1934). Abstract of article by Porai-Koshitz.